United States Patent
Miyagawa et al.

[11] Patent Number: 6,056,986
[45] Date of Patent: May 2, 2000

[54] METHOD AND APPARATUS FOR CONTINUOUSLY STEAMING AND BOILING RICE

[75] Inventors: Tomoyuki Miyagawa; Yoshio Ishii; Takashi Tanaka, all of Tokyo, Japan

[73] Assignee: Showa Sangyo Co., Ltd., Tokyo, Japan

[21] Appl. No.: 09/134,437

[22] Filed: Aug. 14, 1998

[51] Int. Cl.⁷ .............................. A23L 3/00; A23L 1/10
[52] U.S. Cl. ..................... 426/510; 99/443 C; 99/516; 99/417
[58] Field of Search ................ 99/443 C, 516, 99/417; 426/510, 511

[56] References Cited

U.S. PATENT DOCUMENTS

| | | | |
|---|---|---|---|
| 4,385,074 | 5/1983 | Weibye | 426/462 |
| 4,473,593 | 9/1984 | Sturgeon | 426/461 |
| 4,561,347 | 12/1985 | Zaitu | 99/352 |
| 4,571,341 | 2/1986 | Sugimura | 426/510 |
| 4,677,907 | 7/1987 | Weibye | 99/483 |
| 4,873,917 | 10/1989 | Sugimura et al. | 99/355 |
| 4,927,660 | 5/1990 | Sano | 426/618 |
| 4,934,259 | 6/1990 | Watanabe | 99/399 |
| 5,820,909 | 10/1998 | Hyllstam et al. | 426/461 |

FOREIGN PATENT DOCUMENTS

| | | |
|---|---|---|
| 59-11150 | 1/1984 | Japan . |
| 63-9406 | 1/1988 | Japan . |
| 63-245646 | 10/1988 | Japan . |
| 4-129510 | 4/1992 | Japan . |
| 5-308915 | 11/1993 | Japan . |
| 9-107896 | 4/1997 | Japan . |
| 9-294678 | 11/1997 | Japan . |

OTHER PUBLICATIONS

"Rice Cooking Techniques and Their Applications", edited by Hiroaki Horigome, Kogyo Gijutsukai K.K., pp. 314–347 (1990).

*Primary Examiner*—Nina Bhat
*Attorney, Agent, or Firm*—Armstrong, Westerman, Hattori, McLeland & Naughton

[57] ABSTRACT

A method for continuously steaming rice includes the steps of evenly placing rice on a moving carrying surface of a single conveyor belt after the rice absorbed water, primarily steaming the rice by blowing steam to the rice placed on the carrying surface, sprinkling of hot water to be absorbed into the rice, and secondarily steaming the rice by blowing steam into the rice. These steps are performed successively without agitating the rice on the single conveyor belt within a sealed housing. The apparatus has a housing (4, 5) made up of a lower housing member (4) and an upper housing member (5) capable of moving vertically relative to the lower housing member (4). The boundary between the upper and lower housing members (5,4) is sealed by drained water during a steaming step.

4 Claims, 3 Drawing Sheets

METHOD AND APPARATUS FOR CONTINUOUSLY STEAMING AND BOILING RICE

TECHNICAL FIELD present invention relates to a method and an apparatus for cooking grains by continuously steaming the grains while they are moving with and on an endless conveyor belt.

BACKGROUND ART

Large-scale continuous rice cooking apparatus for industrial purposes are mainly divided into two types below (as described in "Rice Cooking Techniques and Their Applications", edited by Hiroaki Horigome, Kogyo Gijutsukai K.K., pp. 314–347 (1990)).
(1) Gas Type Continuous Rice Cooking Machine: A chain conveyor for moving rice cookers is installed to run over a fire grate, and rice is cooked by passing the rice cookers over the fire grate successively. In this method, heating conditions in three stages, i.e., boiling, steaming and baking, which have been utilized traditionally in rice cooking, are reproduced.
(2) Steam Type Conveyor Rice Cooking Machine: Rice is put on a conveyor and moved through a steam tunnel for cooking.

Rice is conveyed so as to successively slide through three steps, i.e., primary steaming, hot-water immersion (water absorption) and secondary steaming, whereby the rice is cooked continuously with movement of the conveyor.

The conveyor rice cooking machine of the above (2) is advantageous in that a rice cooking capability is more flexible and the machine is more easily adapted for larger-scale production, because the amount of rice can be optionally determined depending on the width of the conveyor and the height of rice put on the conveyor.

In addition, other various proposals have also been made for the purposes of, for example, improving quality of cooked rice to become more close to the ideal obtained by using rice cookers, achieving adaptability to various kinds of raw rice and a variety of finally cooked rice, and saving a space required for installation. Typical examples of those proposals are below.
(2-1) "Apparatus for Steaming Grains" (Japanese Unexamined Patent Publication No. Sho 63-9406), "Grain Steaming Apparatus" (Japanese Unexamined Patent Publication No. Sho 63-245646), "Grain Processing Apparatus" (Japanese Unexamined Patent Publication No. Hei 4-129510), and "Grain Continuous Processing Apparatus" (Japanese Unexamined Patent Publication No. Hei 5-308915).

These apparatus each comprises a combination of a primary steaming unit for heating rice by steam, an immersing unit in which the rice heated by heat is passed through hot water to absorb water, and a secondary steaming unit for promoting change into α-starch of the rice having absorbed water, these units being arranged in the order named. This type of continuous steaming apparatus has a feature that an installation space can be saved while ensuring a relatively high production capability. A series of the above-cited Patent Publications disclose various improvements in the component units and combinations thereof. The disclosed apparatus are however complicated in structure as a whole because they need a combination of three units having different specific roles, i.e., the primary steaming unit, the immersing unit and the secondary steaming unit.
(2-2) "Method for Steaming Hard Grains" (Japanese Unexamined Patent Publication No. Sho 59-11150).

This Patent Publication discloses a method for steaming hard grains, which comprises the steps of placing grains on a net conveyor in the form of a uniform layer, heating the grain layer by steam to effect primary steaming, sprinkling water to the grain layer while the grain layer is agitated, causing the grains to absorb water, and heating the grain layer again by steam as with the primary steaming, thereby effecting main secondary steaming. The disclosed method is featured in that an immersing unit such as described in the above (2-1) is not used, grains are continuously processed while being held on a single conveyor, and the amount of water sprinkled is adjusted depending on the property of grains, allowing the grains to absorb water properly. Hitherto, it has been generally considered difficult to absorb water into rice uniformly by the method of sprinkling water. According to the description of this Patent Publication, uniform water absorption by rice can be achieved by sprinkling water under agitation of the rice layer and controlling the amount of water sprinkled. However, the disclosed method is disadvantageous in that an agitating device must be disposed above the belt conveyor and grains of rice in a brittle condition before change into α-starch are easy to collapse, because the rice is agitated before the step of absorbing water into the rice having been subjected to the primary steaming or immediately after the start of the water absorbing step.
(2-3) "Method and Apparatus for Steaming Grains" (Japanese Unexamined Patent Publication No. Hei 9-107896) and "Method and Apparatus for Steaming Rice" (Japanese Unexamined Patent Publication No. Hei 9-294678)

These Patent Publications disclose a continuous rice steaming line for cooking rice carried on a belt conveyor through a primary steaming step of heating the rice by steam, a water applying step of sprinkling water to the rice, and a secondary steaming step of heating the rice by steam. The primary steaming step and the secondary steaming step employ belt conveyors running at different levels independently of each other.

The disclosed apparatus are featured in that water is absorbed into rice by sprinkling the water without using an immersing unit such as described in the above (2-1). In spite of not using any immersing unit, the disclosed apparatus are still complicated in structure because of the need of two belt conveyors which are disposed at different levels for the primary steaming and the secondary steaming.

SUMMARY OF THE INVENTION

An object of the present invention is to simplify an apparatus structure and arrangement as compared with the prior-art apparatus described above, enabling maintenance to be easily performed during operation and/or cleaning service.

Another object of the present invention is to provide a single-line apparatus which can cook rice not only in a state completely changed into α-starch(gelatinized starch), but also in a state partly changed into α-starch for the purposes of quick cooking, etc. and which can also produce cooked rice seasoned with vinegar for sushi or including assorted mixtures, in addition to the so-called white rice (rice cooked using only polished rice), as well as a method for steaming rice using the apparatus.

To achieve the above objects, according to the present invention, rice is steamed while moving with and on a single endless conveyor belt, without being agitated in the steaming process. In addition, an upper housing member of the steaming apparatus is constructed to be able to easily move upward. With this structure, the steaming apparatus can be made open on the upper side so that cleaning and maintenance service for the interior of the apparatus can be performed with ease.

More specifically, a method for continuously steaming rice according to the present invention comprises the steps of placing rice, that has finished preliminary water absorption, on a carrying surface of a single conveyor belt evenly, moving the carrying surface while blowing steam to the rice placed on the carrying surface, and effecting primary steaming of the rice, sprinkling of hot water to absorb water into the rice, and secondary steaming of the rice having absorbed water successively during movement of the carrying surface without agitating the rice, the above steps being performed within a sealed housing. In the water absorbing step, preferably, hot water is sprinkled to absorb water into the rice at the same time as when steam is blown to the rice.

An apparatus for continuously steaming rice according to the present invention is constructed as follows. A housing made up of a lower housing member and an upper housing member capable of moving vertically relative to the lower housing member is sealed at the boundary between the upper and lower housing members by water drained to the boundary during a steaming step. An air-permeable endless conveyor belt and a steam supply device for blowing steam to rice on a carrying surface of the conveyor belt are provided in a space defined by the housing. A sprinkler for sprinkling hot water to the rice is provided upstream of the center of the conveyor belt. A supply port and a discharge port for respectively supplying and discharging raw rice and steamed rice to and from the conveyor belt are also provided. An adjusting plate for adjusting a height of the rice placed on the conveyor belt is provided at the supply port, and a shut-off plate is provided at the discharge port to be capable of tilting in the direction of movement of the carrying surface to moderately seal the discharge port. Steam in the housing is exhausted through exhaust ports formed in a top panel of the upper housing member and then ducts. The ducts each have a double-wall structure comprising an inner tube and an outer tube sliding relative to each other so that the duct can move vertically in a telescoping manner.

In the above construction, rice is supplied through the supply port onto the carrying surface of the endless conveyor belt while the height of the rice placed on the carrying surface is adjusted by the rice height adjusting plate. The rice placed on the carrying surface is moved rearward with the endless conveyor belt, and during the movement, steam is blown from the steam supply device to the rice to heat it for primary steaming. At the same time as when steam is blown from the steam supply device to the rice, hot water is sprinkled to the rice, causing the rice to absorb water. Then, steam is blown from the steam supply device to the rice again to heat it for secondary steaming, thereby completely steaming the rice. The boiled rice is discharged through the discharge port to the outside of the steaming apparatus.

By sprinkling hot water to the rice at the same time as when the rice is heated by steam, the rice can absorb water in a sufficient amount even with the hot water being at a relatively low temperature (60° C. to 85° C.). Because hot water is supplied from above and steam is blown from below for heating the rice, there occurs a slope in distribution of water temperature across a rice layer on the carrying surface in the vertical direction. This results in a difference of the timing at which the rice absorbs water in upper and lower portions of the rice layer. However, the rice can evenly absorb water eventually, and hence agitation of the rice layer is not required.

Between the primary steaming step and the water absorbing step and/or between the water absorbing step and the secondary steaming step, a shut-off plate capable of tilting so as to moderately seal a passage opening for the rice layer may be provided for moderate partition between the above steps.

Further, since the upper and lower housing members are mated with each other just through water sealing, the upper housing member can be easily moved upward to make the steaming apparatus open on the upper side for cleaning or maintenance service of the interior of the apparatus. As a result, it is possible to perform, as needed, cleaning or maintenance service of the interior of the apparatus.

DETAILED DESCRIPTION OF PREFERRED EMBODIMENT

A preferred embodiment of the present invention will be described with reference to the drawings.

Figure 1:
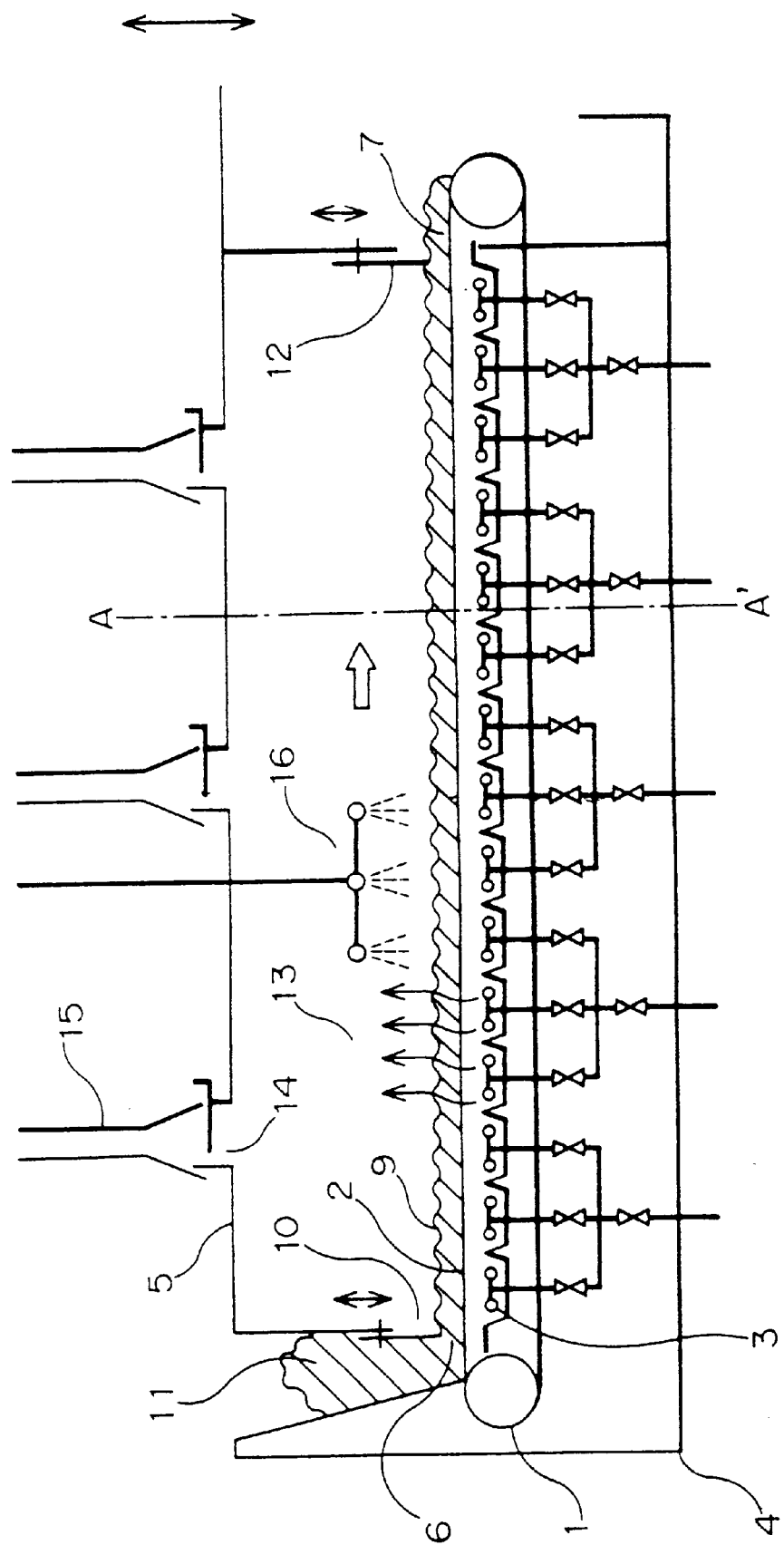
FIG. 1 is a sectional view for explaining an apparatus for continuously steaming rice according to the present invention.

As shown in FIG. 1, a continuous steaming apparatus of the present invention includes a housing made up of an upper housing member 5 and a lower housing member 4. The upper housing member 5 is in the form of a box-like lid capable of moving vertically in covering relation to the lower housing member 4.

A single endless conveyor belt 1 is provided in a space defined by the housing members 4, 5 to carry rice placed on the belt 1 therewith.

The endless conveyor belt 1 is driven by rotary drums disposed at longitudinally spaced ends in the direction of running of the belt. A larger-scale apparatus requiring a larger driving force can also be constructed by using a combination of an endless conveyor belt provided with chains attached to both side edges extending in the direction of running of the belt, and rotary drums provided with sprocket gears for driving the chains.

Banks or walls for supporting a rice layer from both sides are provided to face opposite transverse ends of the endless conveyor belt 1 with respect to the direction of running of the belt. Each of the banks has a larger height than the rice layer, and is arranged a little offset inward from the corresponding side edge of the endless conveyor belt 1.

Preferably, a portion of the bank coming into slide contact with the conveyor belt is made of ethylene-tetrafluoride (trade name: Teflon).

The endless conveyor belt 1 comprises a metal- or resin-made conveyor belt having a large number of pores which are formed in a uniform pattern and has a size enough to allow steam to penetrate the belt evenly, but to block grains of rice from passing through the belt. The conveyor belt 1 is usually formed of a stainless steel net. A carrying surface 2 of the conveyor belt 1 may be coated with a release promoting film made of ethylenetetrafluoride (trade name: Teflon).

The moving speed of the carrying surface 2 is optionally selected depending on the amount and kind of rice to be processed or the kind of finally cooked rice.

Below the rear side of the carrying surface 2 of the endless conveyor belt 1, there is assembled a framework constructed perpendicularly and obliquely with respect to the direction of running of the belt. The carrying surface 2 is supported on the framework so as to slide over it. Because of the framework constructed obliquely, it is possible to avoid such an adverse situation that steam is not supplied to particular positions on the carrying surface 2. Further, by employing such a framework structure for supporting the carrying surface 2, a larger-scale apparatus of which carrying surface is subjected to a greater load can be constructed.

Also, as shown in FIG. 1, a sprinkler 16 is installed above midway the carrying surface 2. The sprinkler 16 can be installed in any position near the center of the carrying surface 2 in the direction of running of the belt. However, the sprinkler 16 is preferably installed in a position upstream of the center of the carrying surface 2 from a point of enabling the sprinkler 16 to be operated in more flexible ways depending on, i.e., the kind of rice to be processed.

The sprinkler 16 comprises a plurality of tubes extending transversely with respect to the direction of running of the belt over a distance almost equal to the belt width, and a plurality of hot-water ejection holes are formed in each of the tubes with predetermined intervals in the transverse direction so that hot water can be evenly sprinkled toward the carrying surface.

The number of tubes of the sprinkler 16 can be set optionally, but it is usually desired to provide 2–6 tubes from a point of enabling hot water to be sprinkled in more flexible manners depending on, e.g., the kind of rice to be processed. The temperature of hot water can also be set optionally, but hot water at 60–95° C. is preferably used because such a temperature range can provide good absorption of water into rice that has been heated by steam and changed into α-starch in the surface thereof. Also, the amount of hot water sprinkled is adjusted appropriately depending on the amount and kind of rice to be processed or the kind of finally cooked rice.

Further, as shown in FIG. 1, in a condition where the lower housing member 4 and the upper housing member 5 are mated with each other, a gap defined between the carrying surface and a layer height adjusting plate 10 provided on the upper housing member 5 serves as a supply port 6 through which rice is supplied onto the carrying surface. Likewise, a gap defined between the carrying surface and a shut-off plate 12 provided on the upper housing member 5 serves as a discharge port 7 through which the cooked rice is discharged from the carrying surface.

Rice that has finished preliminary water absorption is continuously placed into a hopper portion 11 located in front of the supply port 6. The thickness of a layer 9 of the rice supplied onto the carrying surface is adjusted by the height of the layer height adjusting plate 10. The thickness of the rice layer 9 is selected appropriately depending on the amount and kind of rice to be processed or the kind of finally cooked rice.

Because the rice to be processed is put in the hopper portion 11, the supply port 6 is moderately sealed by a stack of the rice in the hopper portion 11 to prevent steam from escaping through the supply port 6. Note that the amount of rice placed into the hopper portion 11 can be controlled by, for example, monitoring a level of the rice in the hopper portion 11 with any desired level sensor and then adjusting the amount of rice supplied.

The height of the shut-off plate 12 defining the discharge port 7 is adjusted so that the discharge port 7 is moderately sealed to prevent steam from escaping through the discharge port 7. Additionally, the shut-off plate 12 is structured to be capable of tilting in the direction of running of the belt to ensure that the discharge port 7 is moderately sealed without causing any damage, e.g., crush, on the layer 9 of the rice steamed and moved through the discharge port 7 successively.

As shown in FIG. 1, exhaust ports 14 are formed in a top panel of the upper housing member 5 at appropriate positions. A duct 15 is provided above the exhaust port 14, and steam rising toward the exhaust port 14 as a natural flow is sucked through the duct 15 by a fan. The exhaust port 14 is not in close contact with the duct 15, whereby the steam exiting through the exhaust port 14 as a natural flow is exhausted outside the housing member while air around the housing member is sucked into the duct 15. The exhaust amount is adjustable by opening and closing a regulating plate associated with the exhaust port 14. A specific value of the exhaust amount is set appropriately depending on the amount and kind of rice to be processed or the kind of finally cooked rice.

Incidentally, the duct 15 has a telescoping structure, i.e., a double-wall structure comprising an inner tube and an outer tube sliding relative to each other, allowing the duct 15 to move vertically together with the upper housing member 5.

Figure 2:
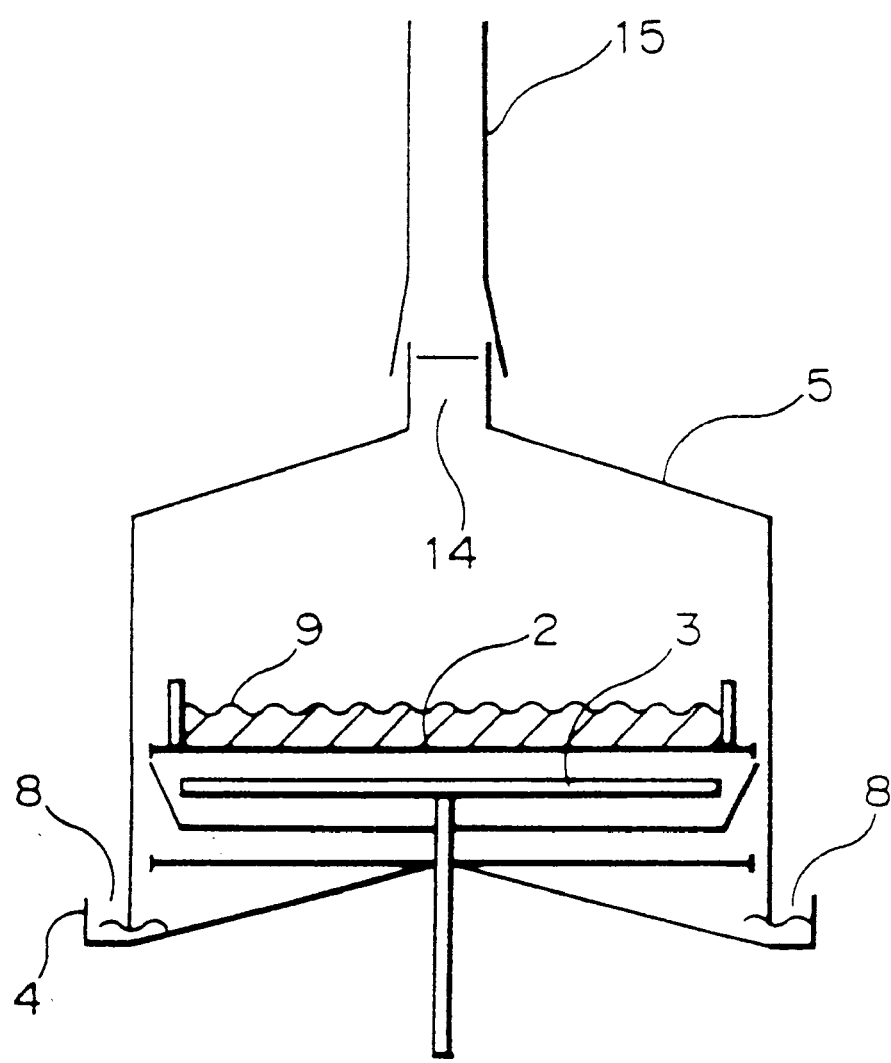
FIG. 2 is a sectional view taken along line A–A' in FIG. 1.

As shown in FIG. 2, the lower housing member 4 is arranged to surround from below a steam supply device 3 disposed on the rear side of the carrying surface 2 of the endless conveyor belt 1, and the upper housing member 5 being of box-like lid is arranged in covering relation to the lower housing member 4 in a vertically movable manner. Though not particularly limited in materials, the lower housing member 4 and the upper housing member 5 are each preferably made of such a material as having both properties of heat resistance and heat insulation, and enabling cleaning and maintenance service to be easily performed. The housing members 4, 5 can be usually made of stainless steel.

The upper housing member 5 is of a structure capable of moving vertically through a large stroke. By moving the upper housing member 5 upward, the steaming apparatus is opened on the upper side, making it easy to perform cleaning and maintenance service for the interior of the apparatus.

As mentioned above with reference to FIG. 2, the lower housing member 4 is arranged to surround from below the steam supply device 3 disposed on the rear side of the carrying surface 2 of the endless conveyor belt 1. A bottom surface of the lower housing member 4 is sloped downward from the center toward opposite side ends transversely with respect to the direction of running of the belt, the side ends being formed into gutters 8.

Water produced upon condensation of steam and then falling downward and extra hot water sprinkled to rice but not absorbed by the rice run down along the sloped bottom surface of the lower housing member 4 and are accumulated in the gutters 8 at both side ends. The water in the gutters 8 is discharged while being adjusted such that some water always resides in the gutters. Since opposite side ends of the upper housing member 5 are engaged in the gutters 8, the adjoining boundary between the upper housing member 5 and the gutters 8 is sealed by the water residing in the gutters, thereby keeping air-tightness of a space defined by the housing members 4, 5.

Figure 3:
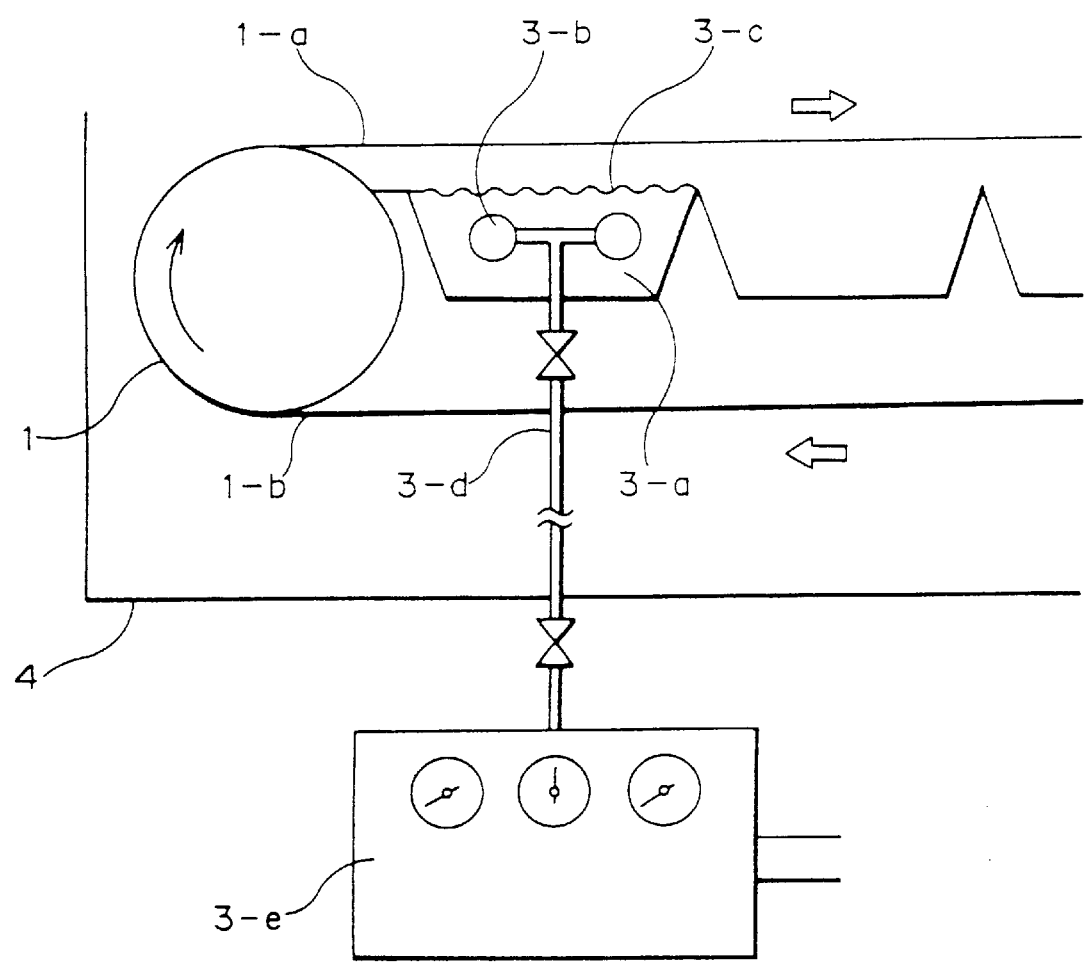
FIG. 3 is a sectional view for explaining a steam supply device for supplying steam into a housing made up of upper and lower housing members.

As shown in FIG. 3, the steam supply device 3 disposed in a space defined between an upper running portion 1-*a* and a lower running portion 1-*b* of the endless conveyor belt 1 comprises a steam chamber 3-*a*, steam supply tubes 3-*b*, a steam guiding porous plate 3-*c*, a steam introducing tube 3-*d*, and a steam regulator 3-*e*, the first three 3-*a* to 3-*c* being installed adjacent to the upper running portion 1-*a*, the last 3-*e* being installed outside the lower housing member 4.

The amount and temperature of steam supplied is selected appropriately depending on the amount and kind of rice to be processed or the kind of finally cooked rice.

The steam chamber 3-*a* is in the form of a box opened upward and having a width almost equal to the transverse width of the endless conveyor belt 1 with respect to the direction of running of the belt. Also, the steam chamber 3-*a* is installed in plural number in closely adjacent parallel relation in the direction of running of the endless conveyor belt 1.

Both side surfaces of the steam chamber 3-*a* transversely of the direction of running of the belt are capable of opening and closing for maintenance service. Water produced upon liquefaction of steam is discharged through a slight gap in the opening and closing portion of the steam chamber 3-*a*, and then falls down to the bottom surface of the lower housing member 4.

The steam supply tubes 3-*b* are each provided in an inner space of the steam chamber 3-*a* to extend over a distance almost equal to the width of the steam chamber. A plurality of steam ejection holes are formed in each of the steam supply tubes 3-*b* with predetermined intervals in the transverse direction such that steam at a high temperature is ejected through the holes downward.

The steam guiding porous plate 3-*c* comprises a porous plate or a mesh with a large number of pores distributed evenly, and is installed to cover an open upper surface of the steam chamber 3-*a*. The steam guiding porous plate 3-*c* has functions of causing steam to be evenly dispersed and supplied to the carrying surface 2, and trapping steam that is apt to easily condense when the steam passes through the porous plate 3-*c*, the trapped steam being condensed into water droplets and then removed. The latter function contributes to preventing water from being supplied in an excessive amount to the rice on the carrying surface.

The steam introducing tube 3-*d* is a hollow tube for introducing steam supplied from the steam regulator 3-*e*, which is installed outside the lower housing member 4, to the steam supply tubes 3-*b*. A lagging material is wound over a portion of the steam introducing tube 3-*d* which is located outside the lower housing member 4, thereby keeping that portion positively insulated against heat. Midway the steam introducing tube 3-*d*, a valve for adjusting the amount of steam supplied is provided at an appropriate position.

The steam regulator 3-*e* is a device for regulating steam into a condition suitable for steaming rice. The steam regulator 3-*e* prepares water vapor having higher preserved energy and consisting of finer mist by removing wet steam, that is apt to easily condense into water droplets, from steam supplied from an ordinary boiler. The temperature of the water vapor thus prepared is in the range of 100–115° C.

A method for processing rice will now be described. A variety of cooked rice can be produced through the following steps.

Sorting step: this step removes impurities, such as small stones and dust, from raw material rice.

Washing step: this step washes out bran, etc. from rice surfaces.

Immersing step: this step absorbs water into the washed rice.

Steaming step: this step processes the rice by the steaming apparatus of the present invention.

Cooling step: this step performs processes such as allowing the steamed rice to settle by its own extra heat, spraying liquefied oil or seasonings to give flavor to the steamed rice, and/or blowing air to forcibly lower the rice temperature.

Freezing step: this step freezes the cooled rice.

By combining the steaming step and the subsequent cooling step under properly adjusted conditions, it is possible to cook rice through a single line not only in a state completely changed into α-starch, but also in a state partly changed into α-starch for the purpose of quick cooking, etc. One example of a method for cooking rice in a state partly changed into α-starch is disclosed in Japanese Unexamined Patent Publication No. Hei 8-70800 proposed by one of the inventors of this application.

Further, the kind of finally cooked rice is not limited to the so-called white rice (rice cooked using only polished rice), and the present invention is also adaptable for producing cooked rice seasoned with vinegar for sushi or including assorted mixtures. In the latter case, the cooked rice is seasoned by spraying liquefied oil or seasonings in the cooling step subsequent to the steaming step according to the present invention.

Specific examples of the process for steaming rice according to the present invention will be described below.

The process for cooking rice in a state completely changed into α-starch is first explained.

Raw rice having been subjected to primary water absorption in the immersing step is placed into the hopper portion 11, and the rice layer 9 having a proper height adjusted by the layer height adjusting plate 10 is moved within the steaming apparatus while resting on the carrying surface 2 of the endless conveyor belt 1.

Steam is evenly supplied from the steam supply device 3 to the carrying surface 2 from below. Water absorbed in the rice during the primary water absorption is heated by the steam, changing the rice surface into α-starch.

At the time the rice surface is changed into α-starch to an appropriate extent, hot water is evenly sprinkled to the rice from the sprinkler 16 installed above the carrying surface 2. The hot water running over the surfaces of individual grains is heated by the steam and absorbed by the rice.

The rice having absorbed water in an appropriate amount is further heated by the steam, thereby producing the steamed rice in a state completely changed into α-starch. After being discharged through the discharge port 7, the steamed rice is sent to the cooling step where it is seasoned with liquefied oil, etc. or is allowed to settle by its own extra heat, following which the cooked rice is finally obtained.

The process for cooking rice in a state partly changed into α-starch for the purposes of quick cooking, etc. is next explained.

Rice is supplied to the steaming apparatus in a like manner as in the above-explained process of cooking rice in a state completely changed into α-starch.

In this process, the sprinkler 16 is not operated, and the rice is processed just under heating by steam supplied from the steam supply device 3. After the steaming step, the steamed rice is sent to the cooling step where it is seasoned with liquefied oil, etc. or is forcibly cooled by air blow, following which the quickly cooked rice is finally obtained.

What is claimed is:

1. A method for continuously steaming rice, comprising the steps of:

evenly placing rice on a moving carrying surface of a single conveyor belt said rice having absorbed water;

primarily steaming the rice by blowing steam to the rice placed on said carrying surface;

sprinkling of hot water so as to be absorbed into the rice; and secondarily steaming the rice by blowing steam to the rice, wherein said steps being performed successively without agitating the rice on said single conveyor belt within a sealed housing.

2. A method for continuously steaming rice according to claim 1, wherein hot water is sprinkled so as to be absorbed into the rice at the same time as when steam is blown to the rice.

3. An apparatus for continuously steaming rice, comprising:

a single endless conveyor belt (1) running within a sealed housing (4, 5) with rice placed on a carrying surface (2);

a housing (4, 5) made up of a lower housing member (4) and an upper housing member (5) capable of moving vertically relative to said lower housing member (4), said housing being sealed at the boundary between said upper and lower housing members (5,4) by water drained to said boundary during a steaming step;

a steam supply device (3) for supplying steam into said housing (4, 5);

a supply port (6) and a discharge port (7) for respectively supplying and discharging the rice to and from said carrying surface (2);

a sprinkler (16) for sprinkling hot water to the rice on said carrying surface (2); and an exhaust port (14) for exhausting the steam from said housing.

4. An apparatus for continuously steaming rice, comprising:

a housing (4, 5) made up of a lower housing member (4) and an upper housing member (5) capable of moving vertically relative to said lower housing member (4), said housing being sealed at the boundary between said upper and lower housing members (5,4) by water drained to said boundary during a steaming step;

an air-permeable endless conveyor belt (1);

a steam supply device (3) for blowing steam to rice on a carrying surface (2) of said conveyor belt (1);

a supply port (6) and a discharge port (7) for respectively supplying and discharging the rice to and from said conveyor belt (1) are provided in a space defined by said housing (4, 5);

an adjusting plate (10) for adjusting a height of the rice placed on said conveyor belt (1) being provided at said supply port (6);

a shut-off plate (12) provided at said discharge port (7) to be capable of tilting in the direction of movement of said carrying surface (2) to moderately seal said discharge port (7);

an exhaust port (14) to exhaust steam in said housing (4, 5), said exhaust ports (14) being formed in a top panel of said upper housing member (5) and ducts (15) capable of sliding vertically; and a sprinkler (16) for sprinkling hot water to the rice, said sprinkler being provided upstream of the center of said carrying surface (2).

* * * * *